Sept. 8, 1959          E. BOLAY          2,903,592

FILTER ARRANGEMENT FOR INFRARED VIEWING APPARATUS

Filed Feb. 10, 1956

INVENTOR.
ERROL BOLAY

BY *Rudolf A. Wild*

AGENT

United States Patent Office 2,903,592
Patented Sept. 8, 1959

2,903,592

FILTER ARRANGEMENT FOR INFRARED VIEWING APPARATUS

Errol Bolay, Waldegg, Uitikon, Switzerland, assignor to Albiswerk Zurich, A.G., Zurich, Switzerland, a Swiss corporation Application February 10, 1956, Serial No. 564,769

6 Claims. (Cl. 250—83.3)

This invention relates to infrared viewing apparatus, and more particularly to apparatus using a concave mirror as part of its optical system. It specifically relates to an arrangement for making the viewing apparatus undetectable by visible light.

Certain types of infrared viewing apparatus, by means of which it is possible to see objects in darkness, employ a concave mirror upon which radiation is incident and which reflects such radiation upon the photosensitive portion of an image converter, by means of which an infrared image is converted into a visible image appearing on a fluorescent screen. The location of such viewing apparatus can be detected by searching with a beam of visible light of relatively low intensity, such as produced by a small flashlight, since the visible light, reflected by the mirror together with the infrared radiation upon the photosensitive portion of an image converter, is reflected from the glass envelope of the converter supporting the photosensitive portion. Thereby the visible light can be reflected back to the mirror surface, making this surface clearly visible. Inasmuch as infrared viewing apparatus is frequently used with the object in mind of undetected observation, this feature of such apparatus is highly undesirable.

It is an object, therefore, of the present invention to provide infrared viewing apparatus which cannot be readily detected by relatively weak visible light.

In accordance with the present invention, there is provided infrared viewing apparatus comprising an image converter including a photosensitive portion. A concave mirror is provided for intercepting radiation and directing this radiation upon the photosensitive portion. Means are located in the optical path between the mirror and the photosensitive portion for selectively absorbing visible radiation received from the mirror.

For a better understanding of the invention, together with other and further objects thereof, reference is had to the following description taken in connection with the accompanying drawing and is scope will be pointed out in the appended claims.

Figure 1:
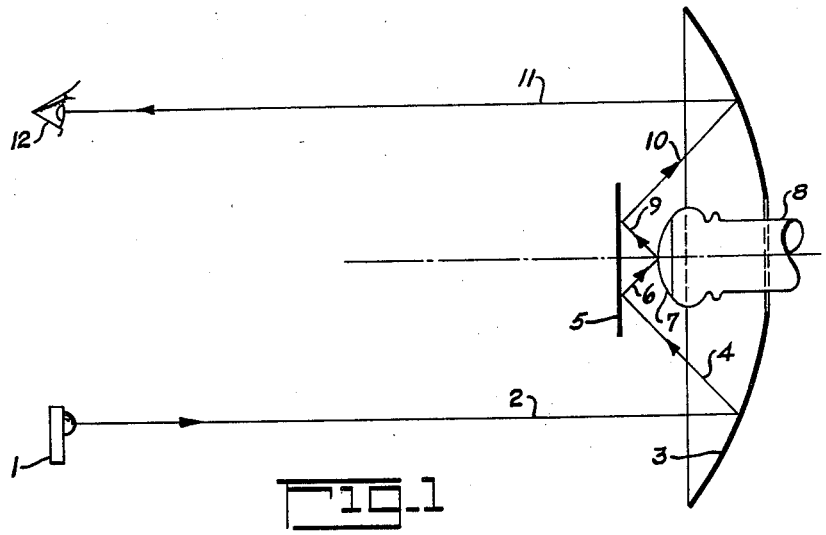
Figure 2:
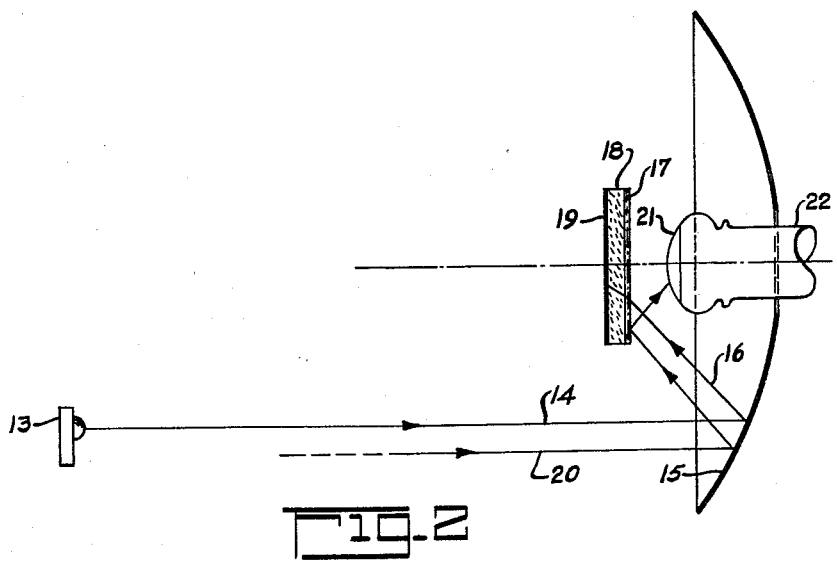

In the accompanying drawings, Fig. 1 shows infrared viewing apparatus of the type known today, whereas Fig. 2 shows apparatus illustrating an embodiment of the present invention.

Referring now more particularly to Fig. 1 of the drawings, there is shown an image converter 8, having a photosensitive portion 7, a concave mirror 3, and a plane mirror 5. The radiation intercepted by mirror 3 is directed upon mirror 5 and reflected upon photosensitive portion 7 of image converter 8.

Fig. 2 shows an arrangement including an image converter 22, having a photosensitive portion 21. For intercepting radiation from distant sources, there is provided a concave mirror 15 directing its intercepted radiation upon a reflector-absorber unit comprising an interference filter 17, adapted to reflect infrared radiation and to pass visible radiation, a support 18 transparent to visible light and a dull, nonreflecting layer 19 on the side of support 18 remote from the photosensitive portion 21.

In the operation of Fig. 1, it will be apparent that infrared radiation intercepted by mirror 3 is reflected upon mirror 5, from which it is reflected upon photosensitive portion 7 where an infrared image is obtained, as is well-known in the art. The infrared image is converted into an electron image by means of photosensitive portion 7, which can then be focussed upon a fluorescent screen (not shown) of the image converter 8, thereby to produce a visible image, as is well-known in the art.

If, now, an attempt is made to detect hidden infrared viewing apparatus by means of relatively weak visible light, the following occurs. A remote flashlight 1 produces a beam of visible light 2, which, when incident upon mirror 3, is reflected as shown by beam 4 to the surface of mirror 5. From there it is reflected as shown by beam 6 to the glass envelope of image converter 8 at the photosensitive portion 7. Generally strong reflection of visible light occurs from this area, and the incident beam 6 is reflected as indicated by beam 9, becomes incident upon mirror 5, is reflected therefrom as indicated by beam 10, and becomes incident upon mirror 3. From there it is reflected as shown by beam 11 and can readily be detected by a remote human eye 12.

In operation of the embodiment of the invention as illustrated by Fig. 2, incident infrared radiation, as illustrated by beam 20, is reflected by mirror 15, becomes incident upon the interference filter 17, from where it is reflected to the photosensitive portion 21 of image converter 22. Again, infrared radiation intercepted by mirror 15 is focussed upon the photosensitive portion 21 in order to produce an infrared image thereon. If, now, a remote flashlight 13 produces a beam of visible light 14, which becomes incident upon mirror 15, this light is reflected as shown by beam 16 and becomes incident upon the interference filter 17. It is, however, not reflected by this filter but passes therethrough, as well as through the support 18, which may be a glass plate, and becomes incident upon the dull, nonreflecting layer 19, which substantially absorbs all incident visible radiation. In this manner, visible light is prevented from reaching the photosensitive portion of the image converter and can, therefore, not be reflected therefrom. All visible light picked up from the flashlight 13 is absorbed in the viewing apparatus and nonreflected, thereby making the apparatus substantially undetectable.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Infrared viewing apparatus comprising an image converter including a photosensitive portion, means including a concave mirror for intercepting radiation and directing same upon said photosensitive portion and a filter arrangement located in the optical path between said concave mirror and said photosensitive portion for selectively absorbing visible radiation received from said mirror.

2. Infrared viewing apparatus including an image converter and having a photosensitive portion mirror means including, a concave mirror for intercepting radiation and directing same upon said photosensitive portion and a filter arrangement located in the optical path between said mirror and said photosensitive portion for selectively absorbing visible radiation and for reflecting upon said photosensitive portion substantially only infrared radiation received from said mirror.

3. Infrared viewing apparatus, comprising an image converter including a photosensitive portion, a concave mirror, an interference filter means located in the optical path between said mirror and said portion for reflecting infrared radiation from said concave mirror upon said photosensitive portion and for passing visible radiation in a direction away from said photosensitive portion, and an absorbing layer arranged on said filter means for absorbing visible radiation passed by said filter.

4. Infrared viewing apparatus, comprising an image converter including a photosensitive portion, a concave mirror located coaxially with said converter for intercepting radiation to be directed to said photosensitive portion, a reflector-absorber unit located adjacent said photosensitive portion in the optical path between said concave mirror and said photosensitive portion, said unit including an interference filter for reflecting intercepted infrared radiation upon said photosensitive portion and for passing visible radiation, said unit also including a layer of material for absorbing visible radiation passed by said filter.

5. For use in infrared viewing apparatus having an image converter and including a photosensitive portion and with a concave mirror coaxially disposed for intercepting radiation to be directed upon said photosensitive portion, a reflector-absorber means disposed adjacent said photosensitive portion and said concave mirror and including an interference filter for reflecting infrared radiation transmitted between said concave mirror and said photosensitive portion, a layer of nonreflecting material for absorbing visible radiation secured to said infrared reflection portion, and a transparent layer disposed intermediate said interference filter and said nonreflecting material.

6. Nondetectable image converting apparatus for producing a visible image from radiation reflected from an object along a first path, comprising in combination, reflecting means arranged along the first path for reflecting along a second path substantially all of the radiation impinging thereon; filter means arranged along said second path for further reflecting a preselected non-visible portion of said reflected radiation along a third path, the remainder of said reflected radiation being absorbed by said filter means; and image converting means arranged along said third path for converting said further reflected non-visible radiation into visible radiation.

References Cited in the file of this patent

UNITED STATES PATENTS

| | | |
|---|---|---|
| 2,247,409 | Roper | July 1, 1941 |
| 2,525,638 | Blout et al. | Oct. 10, 1950 |
| 2,668,478 | Schroeder | Feb. 9, 1954 |
| 2,798,943 | Prideaux | July 9, 1957 |

UNITED STATES PATENT OFFICE

CERTIFICATE OF CORRECTION

Patent No. 2,903,592　　　　　　　　　　　　　　September 8, 1959

Errol Bolay

It is hereby certified that error appears in the above numbered patent requiring correction and that the said Letters Patent should read as corrected below.

In the heading to the printed specification, between lines 7 and 8, insert -- Claims priority, application Switzerland March 25, 1955 --.

Signed and sealed this 26th day of April 1960.

(SEAL)
Attest:
KARL H. AXLINE
Attesting Officer

ROBERT C. WATSON
Commissioner of Patents